DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 8

T904,012

AROMATIC POLYMERS CONTAINING A CONDUCTIVE FILLER

Philip Anthony Staniland, Welwyn Garden City, and Michael Whale, Aylesbury, England, assignors to Imperial Chemical Industries Limited, London, England

Filed Feb. 1, 1972, Ser. No. 222,700

Claims priority, application Great Britain, Feb. 1, 1971, 3,605/71

Int. Cl. H01b *1/06*

U.S. Cl. 252—503

No Drawing. 12 Pages Specification

Electrically conductive compositions comprising aromatic polymers containing the repeating units —Ar—Q—; Ar being a bivalent aromatic residue and Q being —CO— or —$SO_2$—, provided that Ar and Q may vary from unit to unit in the polymer chain, at least some of the Ar units having an aromatic ether group in the polymer chain ortho or para to at least one Q group; and up to 50 weight percent of carbon black as a conducting filler are disclosed. Preferred are the thermoplastic polysulphones such as those having repeating units of the formula:

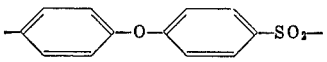

The composition optionally contains a quantity of metal powder, such as aluminium, silver, copper or the like for more even distribution of heat in the resulting article. The compositions disclosed are susceptible to known fabrication methods as applied to other thermoplastic materials including extrusion, casting, blow-moulding, injecting and calendering.

The electrically conductive properties of the resulting articles are used to advantage in heating elements, conductors and resistors among other applications. Even a small amount of the electrically conducting filler, of the order of 0.1 weight percent, results in an article that does not accumulate static electricity. When larger amounts of the electrically conductive filler are used the articles may be conveniently electroplated to form capacitor electrodes, printed circuitry and the like. When an electrically conductive article is produced from the compositions disclosed the electrodes therefor are inserted into the composition during the moulding cycle to reduce contact resistance.

Articles are rendered even more resistant to high temperatures by cross-linking during or after fabrication by irradiation or ionising radiation.